United States Patent
Chan et al.

(10) Patent No.: US 10,540,368 B2
(45) Date of Patent: Jan. 21, 2020

(54) SYSTEM AND METHOD FOR RESOLVING SYNCHRONIZATION CONFLICTS

(71) Applicant: Razer (Asia-Pacific) Pte. Ltd., Singapore (SG)

(72) Inventors: Michael A. Chan, San Francisco, CA (US); Linda Tong, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 427 days.

(21) Appl. No.: 14/042,567

(22) Filed: Sep. 30, 2013

(65) Prior Publication Data
US 2014/0095734 A1 Apr. 3, 2014

Related U.S. Application Data

(60) Provisional application No. 61/708,794, filed on Oct. 2, 2012.

(51) Int. Cl.
*G06F 16/27* (2019.01)
*G06F 16/93* (2019.01)
(Continued)

(52) U.S. Cl.
CPC ............ *G06F 16/27* (2019.01); *G06F 9/5038* (2013.01); *G06F 16/125* (2019.01);
(Continued)

(58) Field of Classification Search
CPC ......... G06F 17/30091; G06F 17/30117; G06F 16/27; G06F 9/5038; H04L 67/1095; H04L 67/1097; H04L 67/2842
(Continued)

(56) References Cited

U.S. PATENT DOCUMENTS 6,811,486 B1 11/2004 Luciano, Jr.
7,315,740 B2 1/2008 Maes
(Continued)

FOREIGN PATENT DOCUMENTS

EP 2 680 207 A1 1/2014

OTHER PUBLICATIONS

Non-Final Office Action dated May 27, 2014, U.S. Appl. No. 14/158,733 by Quan, J., et al., filed Jan. 17, 2014.
(Continued)

*Primary Examiner* — Emmanuel L Moise
*Assistant Examiner* — Xiang Yu
(74) *Attorney, Agent, or Firm* — Mattingly & Malur, PC (57) ABSTRACT

Technology is disclosed herein for resolving synchronization conflicts. According to at least one embodiment, multiple computing devices in a synchronization group can communicate with a cloud storage service for data synchronization. The cloud storage service determines a ranking list for the synchronization group based on a user input indicating the priority of a new computing device in a ranking list. When two conflicting updates to a data set are received from two computing devices, the cloud storage service determines a winning update from the two conflicting updates based on priorities of the first and second computing devices in a ranking list, and distributes the winning update to the computing devices to override the other conflicting update.

24 Claims, 9 Drawing Sheets

(51) Int. Cl.
  *G06F 16/174* (2019.01)
  *G06F 16/11* (2019.01)
  *H04L 29/08* (2006.01)
  *G06F 9/50* (2006.01)

(52) U.S. Cl.
  CPC ............ *G06F 16/174* (2019.01); *G06F 16/93* (2019.01); *H04L 67/1095* (2013.01); *H04L 67/1097* (2013.01); *H04L 67/2842* (2013.01)

(58) Field of Classification Search
  USPC ........................................................ 709/248
  See application file for complete search history.

(56) References Cited

U.S. PATENT DOCUMENTS

| | | | |
|---|---|---|---|
| 7,326,117 B1 | 2/2008 | Best | |
| 7,490,045 B1 | 2/2009 | Flores et al. | |
| D611,494 S | 3/2010 | Akiyoshi et al. | |
| 7,702,329 B1* | 4/2010 | Durig | H04W 8/183 455/432.1 |
| 7,774,457 B1 | 8/2010 | Talwar et al. | |
| 7,903,383 B2 | 3/2011 | Fukano et al. | |
| 8,005,956 B2 | 8/2011 | Williams et al. | |
| D646,695 S | 10/2011 | Hoggarth et al. | |
| 8,234,348 B1 | 7/2012 | Tulchinsky et al. | |
| 8,290,920 B2 | 10/2012 | Mahajan et al. | |
| 8,315,977 B2 | 11/2012 | Anand et al. | |
| 8,423,511 B1 | 4/2013 | Bhatia | |
| D682,874 S | 5/2013 | Frijlink et al. | |
| 8,438,298 B2 | 5/2013 | Arai et al. | |
| D683,737 S | 6/2013 | Brinda et al. | |
| 8,473,577 B2 | 6/2013 | Chan | |
| 8,475,275 B2 | 7/2013 | Weston et al. | |
| 8,478,816 B2 | 7/2013 | Parks et al. | |
| 8,494,576 B1 | 7/2013 | Bye et al. | |
| 8,495,129 B2 | 7/2013 | Wolman et al. | |
| 8,515,902 B2 | 8/2013 | Savage | |
| D689,505 S | 9/2013 | Convay et al. | |
| 8,539,567 B1 | 9/2013 | Logue et al. | |
| 8,577,292 B2 | 11/2013 | Huibers | |
| 8,589,140 B1 | 11/2013 | Poulin | |
| 8,606,948 B2 | 12/2013 | Evans et al. | |
| 8,666,938 B1 | 3/2014 | Pancholy | |
| 8,747,232 B1 | 6/2014 | Quan et al. | |
| 8,764,555 B2 | 7/2014 | Quan et al. | |
| 8,775,449 B2 | 7/2014 | Quan et al. | |
| D710,878 S | 8/2014 | Jung | |
| 8,812,601 B2 | 8/2014 | Hsieh et al. | |
| 8,840,461 B2 | 9/2014 | Quan et al. | |
| 8,868,859 B2 | 10/2014 | Schmidt et al. | |
| D718,334 S | 11/2014 | Cranfill | |
| 8,913,056 B2 | 12/2014 | Zimmer et al. | |
| D726,753 S | 4/2015 | Angelides | |
| D730,383 S | 5/2015 | Brinda et al. | |
| D731,537 S | 6/2015 | Jeong et al. | |
| D732,549 S | 6/2015 | Kim | |
| D734,775 S | 7/2015 | Nagasawa et al. | |
| D736,822 S | 8/2015 | Tursi et al. | |
| D737,852 S | 9/2015 | De La Rosa et al. | |
| 9,274,780 B1 | 3/2016 | Velummylum et al. | |
| 2001/0039212 A1 | 11/2001 | Sawano et al. | |
| 2002/0161908 A1 | 10/2002 | Benitez et al. | |
| 2003/0069037 A1* | 4/2003 | Kiyomoto | H04W 60/04 455/552.1 |
| 2003/0078959 A1 | 4/2003 | Yeung et al. | |
| 2004/0018876 A1 | 1/2004 | Kubota et al. | |
| 2004/0121837 A1 | 6/2004 | Chiang et al. | |
| 2004/0203381 A1 | 10/2004 | Cahn et al. | |
| 2005/0147130 A1* | 7/2005 | Hurwitz | G06F 17/30578 370/503 |
| 2006/0030408 A1 | 2/2006 | Kiiskinen | |
| 2006/0073788 A1 | 4/2006 | Halkka et al. | |
| 2007/0130217 A1* | 6/2007 | Linyard | G06F 16/275 |
| 2008/0055311 A1 | 3/2008 | Aleksic et al. | |
| 2008/0168235 A1* | 7/2008 | Watson | G06F 9/485 711/135 |
| 2008/0201705 A1 | 8/2008 | Wookey | |
| 2008/0220878 A1 | 9/2008 | Michaelis | |
| 2009/0063690 A1 | 3/2009 | Verthein et al. | |
| 2009/0077263 A1 | 3/2009 | Koganti et al. | |
| 2009/0106110 A1 | 4/2009 | Stannard et al. | |
| 2009/0204966 A1 | 8/2009 | Johnson et al. | |
| 2009/0233590 A1* | 9/2009 | Sinton | H04B 1/034 455/418 |
| 2009/0282125 A1 | 11/2009 | Jeide et al. | |
| 2010/0173712 A1 | 7/2010 | Buhr | |
| 2010/0235511 A1 | 9/2010 | Kai | |
| 2010/0257403 A1 | 10/2010 | Virk et al. | |
| 2010/0332401 A1 | 12/2010 | Prahlad et al. | |
| 2011/0076941 A1 | 3/2011 | Taveau et al. | |
| 2011/0078319 A1 | 3/2011 | Ishida | |
| 2011/0093567 A1 | 4/2011 | Jeon et al. | |
| 2011/0106755 A1 | 5/2011 | Hao et al. | |
| 2011/0126168 A1 | 5/2011 | Ilyayev | |
| 2011/0219105 A1 | 9/2011 | Kryze et al. | |
| 2011/0252071 A1 | 10/2011 | Cidon | |
| 2011/0275316 A1 | 11/2011 | Suumaki et al. | |
| 2011/0286026 A1 | 11/2011 | Matsuzawa | |
| 2011/0313922 A1 | 12/2011 | Ben Ayed | |
| 2012/0017236 A1 | 1/2012 | Stafford et al. | |
| 2012/0023250 A1 | 1/2012 | Chen et al. | |
| 2012/0028714 A1 | 2/2012 | Gagner et al. | |
| 2012/0036218 A1 | 2/2012 | Oh et al. | |
| 2012/0036239 A1 | 2/2012 | Donaghey et al. | |
| 2012/0064908 A1 | 3/2012 | Fox et al. | |
| 2012/0069131 A1 | 3/2012 | Abelow | |
| 2012/0079095 A1 | 3/2012 | Evans et al. | |
| 2012/0079126 A1 | 3/2012 | Evans et al. | |
| 2012/0084803 A1 | 4/2012 | Johansson et al. | |
| 2012/0110568 A1 | 5/2012 | Abel et al. | |
| 2012/0128172 A1 | 5/2012 | Alden | |
| 2012/0149309 A1 | 6/2012 | Hubner et al. | |
| 2012/0171951 A1 | 7/2012 | 't Hooft | |
| 2012/0203932 A1 | 8/2012 | da Costa et al. | |
| 2012/0210343 A1 | 8/2012 | McCoy et al. | |
| 2012/0278439 A1 | 11/2012 | Ahiska et al. | |
| 2012/0290717 A1 | 11/2012 | Luna | |
| 2012/0303778 A1 | 11/2012 | Ahiska et al. | |
| 2012/0311820 A1 | 12/2012 | Chang | |
| 2013/0007203 A1 | 1/2013 | Szu | |
| 2013/0008611 A1 | 1/2013 | Marcus et al. | |
| 2013/0044106 A1 | 2/2013 | Shuster et al. | |
| 2013/0045795 A1 | 2/2013 | Fiedler | |
| 2013/0080964 A1 | 3/2013 | Shigeta | |
| 2013/0086114 A1 | 4/2013 | Wilson et al. | |
| 2013/0117806 A1 | 5/2013 | Parthasarathy et al. | |
| 2013/0159890 A1 | 6/2013 | Rossi | |
| 2013/0219381 A1 | 8/2013 | Lovitt | |
| 2013/0223240 A1 | 8/2013 | Hayes et al. | |
| 2013/0225087 A1 | 8/2013 | Uhm | |
| 2013/0304898 A1 | 11/2013 | Aggarwal et al. | |
| 2013/0339058 A1 | 12/2013 | Gotlib et al. | |
| 2014/0040239 A1 | 2/2014 | Hirsch | |
| 2014/0053054 A1 | 2/2014 | Shen et al. | |
| 2014/0101300 A1 | 4/2014 | Rosensweig et al. | |
| 2014/0170978 A1 | 6/2014 | Wolman et al. | |
| 2014/0215030 A1 | 7/2014 | Terwilliger et al. | |
| 2014/0245203 A1 | 8/2014 | Lee et al. | |
| 2014/0379853 A1 | 12/2014 | Shelton | |
| 2015/0286388 A1 | 10/2015 | Jeon et al. | |
| 2015/0326655 A1 | 11/2015 | Quan et al. | |
| 2015/0365463 A1 | 12/2015 | Quan et al. | |
| 2015/0365817 A1 | 12/2015 | Chu et al. | |
| 2015/0367238 A1 | 12/2015 | Perrin et al. | |
| 2015/0370428 A1 | 12/2015 | Chan et al. | |
| 2015/0373107 A1 | 12/2015 | Chan et al. | |

OTHER PUBLICATIONS

Non-Final Office Action dated Jun. 9, 2014, for U.S. Appl. No. 14/167,939 by Quan, J., et al., filed Jan. 29, 2014.

(56) References Cited

OTHER PUBLICATIONS

Restriction Requirement dated Jun. 12, 2014, for U.S. Appl. No. 14/251,463 by Quan, J., et al., filed Apr. 11, 2014.
Final Office Action dated Jul. 24, 2014, U.S. Appl. No. 14/179,709 by Quan, J., et al., filed Feb. 13, 2014.
Final Office Action dated Nov. 6, 2014, U.S. Appl. No. 14/158,682 by Quan, J., et al., filed Jan. 17, 2004.
International Search Report dated Sep. 11, 2014, 7 pps., for International Application No. PCT/2013/031488 filed Mar. 21, 2014.
Layton, J.B., "User Space File Systems," Linux Magazine, accessed at http://www.linux-mag.com/id/7814, Jun. 22, 2010, pp. 1-4.
Non Final Office Action dated Nov. 3, 2014, for U.S. Appl. No. 13/772,163 by Quan, J., filed Feb. 20, 2013.
Non Final Office Action dated Oct. 23, 2014, for U.S. Appl. No. 14/252,674 by Chan, M.A., et al., filed Apr. 14, 2014.
Non-Final Office Action dated Aug. 26, 2014, for U.S. Appl. No. 14/267,823 by Chan, M.A., et al., filed May 1, 2014.
Notice of Allowance dated Aug. 12, 2014, U.S. Appl. No. 14/179,709 by Quan, J., et al., filed Feb. 13, 2014.
Notice of Allowance dated Sep. 3, 2014, U.S. Appl. No. 14/160,444 by Quan, J., et al., filed Jan. 21, 2014.
Restriction Requirement dated Aug. 29, 2014, for U.S. Appl. No. 14/252,674 by Chan, M.A., et al., filed Apr. 14, 2014.
U.S. Appl. No. 14/479,087 by Chan, M.A et al., filed Sep. 5, 2014.
U.S. Appl. No. 14/479,140 by Chan, M.A et al., filed Sep. 5, 2014.
Non-Final Office Action dated May 8, 2014, U.S. Appl. No. 14/179,744 by Quan, J., et al., filed Feb. 13, 2014.
Non-Final Office Action dated May 9, 2014, U.S. Appl. No. 14/160,444 by Quan, J., et al., filed Jan. 21, 2014.
Notice of Allowance dated May 14, 2014, Co-pending U.S. Appl. No. 14/158,715, by Quan et al., filed Jan. 17, 2014.
Notice of Allowance dated May 20, 2014, Co-pending U.S. Appl. No. 14/173,680, by Quan et al., filed Feb. 5, 2014.
Co-Pending Design U.S. Appl. No. 29/486,424 by Chan, M.A., et al., filed Mar. 28, 2014.
Co-Pending U.S. Appl. No. 13/772,163 by Quan, J., filed Feb. 20, 2013.
Co-Pending U.S. Appl. No. 13/865,515 by Quan, J., et al., filed Apr. 18, 2013.
Co-Pending U.S. Appl. No. 14/042,509 by Chan, M.A., et al., filed Sep. 30, 2013.
Co-Pending U.S. Appl. No. 14/043,034 by Chan, M.A., et al., filed Oct. 1, 2013.
Co-Pending U.S. Appl. No. 14/158,682 by Quan, J., et al., filed Jan. 17, 2004.
Co-Pending U.S. Appl. No. 14/158,715 by Quan, J., et al., filed Jan. 17, 2014.
Co-Pending U.S. Appl. No. 14/158,733 by Quan, J., et al., filed Jan. 17, 2014.
Co-Pending U.S. Appl. No. 14/160,444 by Quan, J., et al., filed Jan. 21, 2014.
Co-Pending U.S. Appl. No. 14/167,834 by Quan, J., et al., filed Jan. 29, 2014.
Co-Pending U.S. Appl. No. 14/167,939 by Quan, J., et al., filed Jan. 29, 2014.
Co-Pending U.S. Appl. No. 14/173,680 by Quan, J., et al., filed Feb. 5, 2014.
Co-Pending U.S. Appl. No. 14/179,709 by Quan, J., et al., filed Feb. 13, 2014.
Co-Pending U.S. Appl. No. 14/179,744 by Quan, J., et al., filed Feb. 13, 2014.
Co-Pending U.S. Appl. No. 14/221,174 by Chan, M.A., et al., filed Mar. 20, 2014.
Co-Pending U.S. Appl. No. 14/228,190 by Quan, J., et al., filed Mar. 27, 2014.
Co-Pending U.S. Appl. No. 14/251,463 by Quan, J., et al., filed Apr. 11, 2014.
Co-Pending U.S. Appl. No. 14/252,674 by Chan, M.A., et al., filed Apr. 14, 2014.
Co-Pending U.S. Appl. No. 14/267,823 by Chan, M.A., et al., filed May 1, 2014.
International Search Report and Written Opinion dated Feb. 3, 2014, 7 pp., for International Application No. PCT/2013/62737 filed Sep. 30, 2013.
International Search Report and Written Opinion dated Feb. 3, 2014, 7 pp., for International Application No. PCT/US13/62729 filed Sep. 30, 2013.
International Search Report and Written Opinion dated Feb. 3, 2014, 9 pp., for International Application No. PCT/US13/62986 filed Oct. 2, 2013.
Non-Final Office Action dated Apr. 2, 2014, U.S. Appl. No. 14/179,709 by Quan, J., et al., filed Feb. 13, 2014.
Non-Final Office Action dated Apr. 3, 2014, U.S. Appl. No. 14/158,682 by Quan, J., et al., filed Jan. 17, 2004.
Non-Final Office Action dated Mar. 10, 2014, Co-pending U.S. Appl. No. 14/173,680, by Quan et al., filed Feb. 5, 2014.
Non-Final Office Action dated Mar. 7, 2014, Co-pending U.S. Appl. No. 14/158,715, by Quan et al., filed Jan. 17, 2014.
Notice of Allowance dated Apr. 15, 2014, Co-pending U.S. Appl. No. 14/167,834, by Quan et al., filed Jan. 29, 2014.
McCormick, Z. and Schmidt, D. C., "Data Synchronization Patterns in Mobile Application Design," Vanderbilt University, pp. 1-14 (2012).
Notice of Allowance dated Oct. 29, 2014, for U.S. Appl. No. 14/167,939 by Quan, J., et al., filed Jan. 29, 2014.
Notice of Allowance dated Oct. 29, 2014, for U.S. Appl. No. 14/179,744 by Quan, J., et al., filed Feb. 13, 2014.
Notice of Allowance dated Nov. 25, 2014, for U.S. Appl. No. 14/252,674 by Chan, M.A., et al., filed Apr. 14, 2014.
Non Final Office Action dated Dec. 3, 2014, for U.S. Appl. No. 14/251,463 by Quan, J., et al., filed Apr. 11, 2014.
Notice of Allowance dated Dec. 4, 2014, for U.S. Appl. No. 14/479,140 by Chan, M.A., et al., filed Sep. 5, 2014.
Notice of Allowance dated Dec. 12, 2014, for U.S. Appl. No. 14/479,140 by Chan, M.A., et al., filed Sep. 5, 2014.
Notice of Allowance dated Dec. 17, 2014, for U.S. Appl. No. 14/267,823 by Chan, M.A., et al., filed May 1, 2014.
Notice of Allowance dated Dec. 19, 2014, for U.S. Appl. No. 14/479,140 by Chan, M.A., et al., filed Sep. 5, 2014.
Notice of Allowance dated Dec. 22, 2014, for U.S. Appl. No. 14/179,744 by Quan, J., et al., filed Feb. 13, 2014.
Final Office Action dated Dec. 23, 2014, for U.S. Appl. No. 14/158,733 by Quan, J., et al., filed Jan. 17, 2014.
Notice of Allowance dated Mar. 17, 2015, for U.S. Appl. No. 14/158,733, Quan, J., et al., filed Jan. 17, 2014.
Notice of Allowance dated Mar. 30, 2015, for U.S. Appl. No. 13/772,163, Quan, J., filed Feb. 20, 2013.
Notice of Allowance dated Mar. 30, 2015, for U.S. Appl. No. 14/267,823, Chan, M.A., et al., filed May 1, 2014.
Non-Final Office Action dated Apr. 8, 2015, for U.S. Appl. No. 13/865,515, Quan, J., et al., filed Apr. 18, 2013.
Non-Final Office Action dated Apr. 8, 2015, for U.S. Appl. No. 14/228,190, Quan, J., et al., filed Mar. 27, 2014.
Notice of Allowance dated Apr. 15, 2015, for U.S. Appl. No. 14/479,140, Chan, M.A., et al., filed Sep. 5, 2014.
Co-pending U.S. Appl. No. 14/042,398 by Chan, M.A., et al., filed Sep. 30, 2013.
Khan, S., "ZDBox for Android is All-In-One Toolkit to Monitor and Manage Device," dated Mar. 4, 2011, Retrieved from the Internet URL: http://www.addictivetips.com/mobile/zdbox-for-android-is-all-in-one-toolkit-to-monitor-and-manage-device/, retrieved on Oct. 27, 2015, pp. 1-6.
Kevin, "Android Automatic App Updates Part 2," Worldstart's Tech Tips and Computer Help, dated Apr. 10, 2012, Retrieved from the Internet URL: http://www.worldstart.com/android-automatic-app-updates-part-2/, retrieved on Oct. 22, 2015, pp. 1-3.
Nickinson, P., "Add a signature in gmail," Android Central, dated Nov. 29, 2010, Retrieved from the Internet URL: http://www.androidcentral.com/add-signature-gmail, retrieved on Oct. 26, 2015, pp. 1-10.
Non-Final Office Action dated May 15, 2015, for U.S. Appl. No. 14/042,398, by Chan, M.A., et al., filed Sep. 30, 2013.

(56) References Cited

OTHER PUBLICATIONS

Non-Final Office Action dated Jun. 22, 2015, for U.S. Appl. No. 14/043,034, of Quan, J., et al., filed Oct. 1, 2013.
Non-Final Office Action dated Jun. 22, 2015, for U.S. Appl. No. 14/158,682, of Quan, J., et al., filed Jan. 17, 2014.
Non-Final Office Action dated Jul. 20, 2015, for U.S. Appl. No. 14/042,509, of Chan, M.A., et al., filed Sep. 30, 2013.
Notice of Allowance dated Jul. 24, 2015, for U.S. Appl. No. 14/158,733, of Quan, J., et al., filed Jan. 17, 2014.
Notice of Allowance dated Sep. 2, 2015, for U.S. Appl. No. 14/042,398, of Chan, M.A., et al., filed Sep. 30, 2013.
Final Office Action dated Sep. 9, 2015, for U.S. Appl. No. 14/251,463, of Quan, J., et al., filed Apr. 11, 2014.
Notice of Allowance dated Oct. 2, 2015, for U.S. Appl. No. 14/228,190, of Quan, J., et al., filed Mar. 27, 2014.
Notice of Allowance dated Oct. 7, 2015, for U.S. Appl. No. 13/865,515, of Quan, J., et al., filed Apr. 18, 2013.
Notice of Allowance dated Nov. 4, 2015, for U.S. Appl. No. 14/158,733, of Quan, J., et al., filed Jan. 17, 2014.
Ex Parte Quayle Action mailed Dec. 3, 2015, for U.S. Appl. No. 29/486,424, of Chan, M. A., et al., filed Mar. 28, 2014.
Notice of Allowance dated Jan. 11, 2016, for U.S. Appl. No. 14/042,398, of Chan, M.A., et al., filed Sep. 30, 2013.
Notice of Allowance dated Feb. 12, 2016, for U.S. Appl. No. 13/865,515, of Quan, J., et al., filed Apr. 18, 2013.
Notice of Allowance dated Feb. 12, 2016, for U.S. Appl. No. 14/228,190, of Quan, J., et al., filed Mar. 27, 2014.
Final Office Action dated Feb. 26, 2016, for U.S. Appl. No. 14/042,509, of Chan, M.A., et al., filed Sep. 30, 2013.
Final Office Action dated Feb. 29, 2016, for U.S. Appl. No. 14/043,034, of Quan, J., et al., filed Oct. 1, 2013.
Non-Final Office Action dated Jun. 8, 2016, for U.S. Appl. No. 14/840,636, of Chan, M.A., et al., filed Aug. 31, 2015.
Non-Final Office Action dated Jun. 8, 2016, for U.S. Appl. No. 14/840,611, of Chan, M.A., et al., filed Aug. 31, 2015.
Notice of Allowance dated Aug. 3, 2016, for U.S. Appl. No. 29/486,424, of Chan, M.A., et al., filed Mar. 28, 2014.
Non-Final Office Action dated Aug. 12, 2016, for U.S. Appl. No. 14/221,174, of Chan, M.A., et al., filed Mar. 20, 2014.
Non-Final Office Action dated Sep. 12, 2016, for U.S. Appl. No. 14/042,509, of Chan, M.A., et al., filed Sep. 30, 2013.
Non Final Office Action dated Sep. 19, 2016, for U.S. Appl. No. 14/043,034, of Quan, J., et al., filed Oct. 1, 2013.

* cited by examiner

| Device ID | Rank |
|---|---|
| Device 310 | 1 |
| Device 320 | 2 |
|  |  |
|  |  |
|  |  |

*FIG. 5A*

| Device ID | Rank |
|---|---|
| Device 310 | 1 |
| Device 330 | 2 |
| Device 320 | 3 |
| | |
| | |

SYSTEM AND METHOD FOR RESOLVING SYNCHRONIZATION CONFLICTS

PRIORITY CLAIM

This application claims to the benefit of U.S. Provisional Patent Application No. 61/708,794, entitled "CLOUD COMPUTING INTEGRATED OPERATING SYSTEM", which was filed on Oct. 2, 2012, which is incorporated by reference herein in its entirety.

FIELD OF THE INVENTION

At least one embodiment of the present invention pertains to mobile devices, and more particularly, to resolving synchronization conflicts for mobile devices.

BACKGROUND

Data synchronization is a process of establishing consistency among data between two or more devices (e.g. a source device and a target device). The data synchronization process maintains a continuous harmonization of the data among the source device and the target storage over time. The process can be utilized in a variety of applications, including file synchronization and mobile device synchronization.

For instance, cloud storage is used for data synchronization for computing devices such as mobile devices. A cloud storage is a networked enterprise storage where data is stored not only in the user's computer, but in virtualized pools of storage which are generally hosted by remove servers or clusters. The mobile devices may use the cloud storage to synchronize data (e.g. files) via the cloud storage.

The data or file synchronization among the devices can be either one-way or two-way. In one-way synchronization (also referred to as mirroring), updated files or data are copied from a source location to one or more target locations (e.g. locations on a separate device), but no files or data are copied back to the source location. In two-way file synchronization, updated files or data are copied in both directions, usually with the purpose of keeping the two locations identical to each other. The term synchronization generally refers to two-way synchronization in this application.

There may be conflicts detected during the synchronization. Conflicts are situations where a file or a data set has been modified on both sources with different contents, as opposed to where it has only been modified on one. Undetected conflicts can lead to overwriting copies of the file with the most recent version, causing data loss. For conflict detection, the synchronization process generally needs to keep a database of the synchronized files.

Cloud storage services, e.g. Dropbox or Google Drive, changes the file names to avoid conflicts. For instance, if two user accounts change the same file at the same time, when the cloud storage synchronized that file between these two user accounts, the cloud storage does not try to merge the changes directly. Instead, the cloud storage saves the original file as well as a second version which has the same name but is appended with additional characters (e.g. "conflicted copy"). The cloud storage may further change the file name with the name of the user account or computer responsible for the change, and the date the conflict occurred.

However, by preserving two conflicted file with different file name, a user needs to manually decide which file among the conflicted files is the version he intended to maintain or use. Although by preserving the conflicted files, the cloud storage ensures the intended version not to be overwritten; such a solution requires the user to make the judgment later for each occasion of synchronization conflict.

SUMMARY

Technology introduced here provides a mechanism to enable multiple computing devices to resolve synchronization conflicts without intervention from the user. According to at least one embodiment, multiple computing devices in a synchronization group can communicate with a cloud storage service for data synchronization. The cloud storage service determines a ranking list for the synchronization group based on a user input indicating the priority of a new computing device in a ranking list. When two conflicting updates to a data set are received from two computing devices, the cloud storage service determines a winning update from the two conflicting updates based on priorities of the first and second computing devices in a ranking list, and distributes the winning update to the computing devices to override the other conflicting update In accordance with the techniques introduced here, therefore, a computer-implemented method for resolving synchronization conflicts is provided. The method receives, at a server from a new computing device, a signal indicating that a user adds the new computing device to a synchronization group including one or more computing devices for the user. The method further sends, from the server to the new computing device, an instruction to present a user interface to prompt the user to decide a priority of the new computing device in a ranking list for the synchronization group. The method determines, at a server, the ranking list for the synchronization group based on user inputs in response to the user interface. The method receives, at the server from a first computing device of the synchronization group, a first update to a data set and concurrently receiving, at the server from a second computing device of the synchronization group, a second update to the data set. The method determines from the ranking list that the first computing device has a priority higher than a priority of the second computing device; and automatically applying the first update to the data set without user intervention.

In accordance with the techniques introduced here, therefore, a computing device for resolving synchronization conflicts is also provided. The computing device includes a storage component, an output component, a network component and a processor. The storage component is configured to store one or more data sets. The output component is configured to present a user interface to prompt a user to decide a priority of the computing device in a ranking list for a synchronization group. The network component is configured to send to a user input in response to the user interface for the ranking list to a server (e.g. a cloud storage service). The network component is further configured to send a first update of the data set to the server. Concurrently, the second computing device sends a second update of the data set to the server. The computing device will receive the second update via the network component if the server determines the second computing device has a higher priority. Accordingly, the processor is configured to apply the second update to the data set stored in the storage component.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
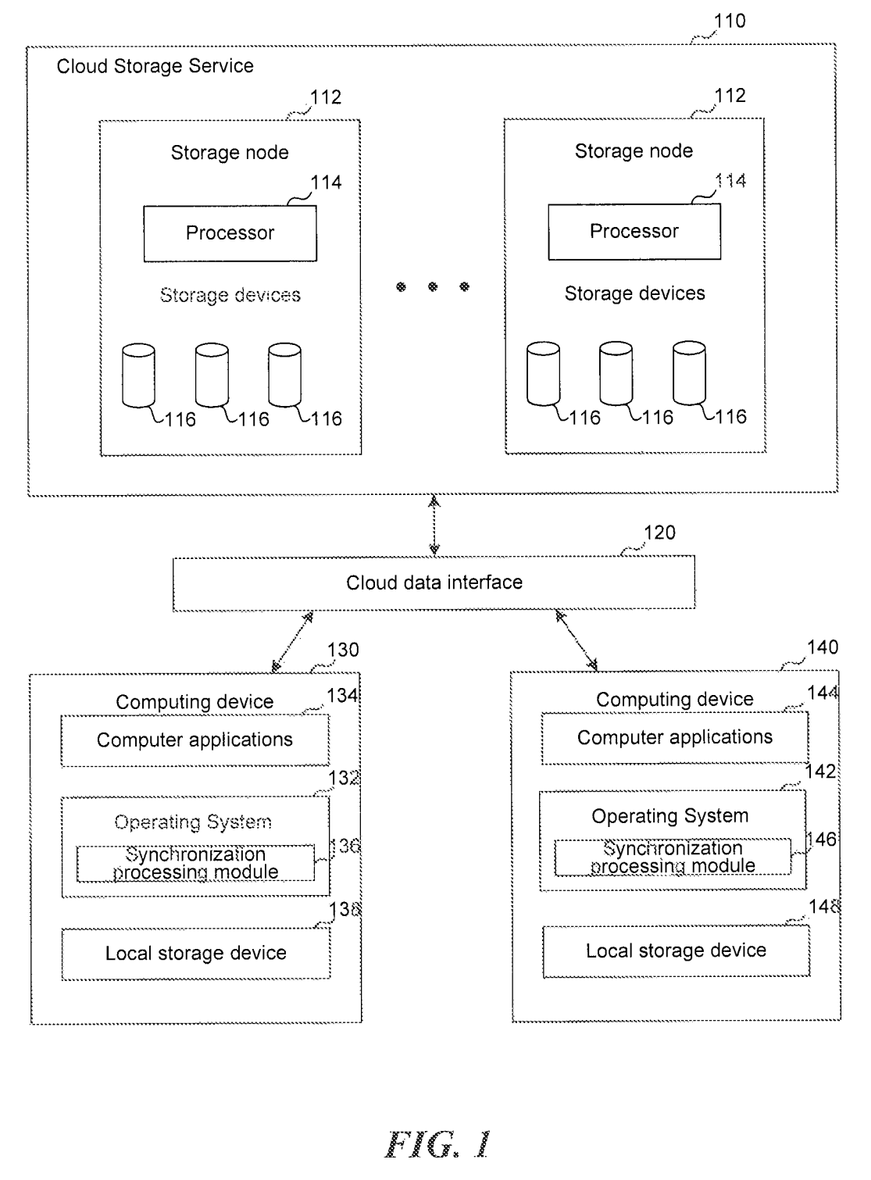
FIG. 1 illustrates an example system for data synchronization between computing devices.

FIG. 1 illustrates an example system for data synchronization between computing devices. The system includes a cloud storage service 110 configured to store synchronized data and determine synchronization conflicts. In one embodiment, the cloud storage service 110 can be a storage cluster having computer nodes interconnected with each other by a network. The storage cluster can communicate with other computing devices via the Internet. The cloud storage service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud data interface 120 can also be included to receive data from and send data to computing devices. The cloud data interface 120 can include network communication hardware and network connection logic to receive the information from computing devices. The network can be a local area network (LAN), wide area network (WAN) or the Internet. The cloud data interface 120 may include a queuing mechanism to organize data update received from or sent to the computing devices 130 and 140.

The computing devices 130 and 140 can synchronize the data stored in the devices 130 and 140 via the cloud storage service 110. The cloud storage service 110 can maintain a current copy of the synchronized data in the cloud storage service 110. When a computing device 130 or 140 plans to commit an update to the data, the device 130 or 140 sends the update to the cloud storage service 110. The cloud storage service 110 determines the winning update if there are multiple conflicting updates to the data received from the computing devices 130 and 140. The cloud storage service 100 further distributes the determined winning updates to the computing devices 130 and 140 so that all computing devices maintain a consistent copy of the synchronized data.

The computing devices 130 and 140 do not need to communicate with each other directly. The cloud storage service 100 is responsible for communicating with each computing device for the data synchronization.

Although FIG. 1 illustrates two computing devices 130 and 140, a person having ordinary skill in the art will readily understand that the technology disclosed herein can be applied to data synchronization among more than two computing devices.

A computing device 130 includes an operating system 132 to manage the hardware resources of the computing device 130 and provides services for running computer applications 134. The computer applications 134 stored in the computing device 130 require the operating system 132 to properly run on the device 130. The computing device 130 can send backup and update of the data of the computer applications 134 to the cloud storage service 110. The computing device 130 includes at least one local storage device 138 to store the computer applications and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 includes a synchronization processing module 136 to process data synchronization via the cloud storage server 110. Similarly, another computing device 140 can also process send and receive data synchronization via the cloud storage service 110.

Figure 2:
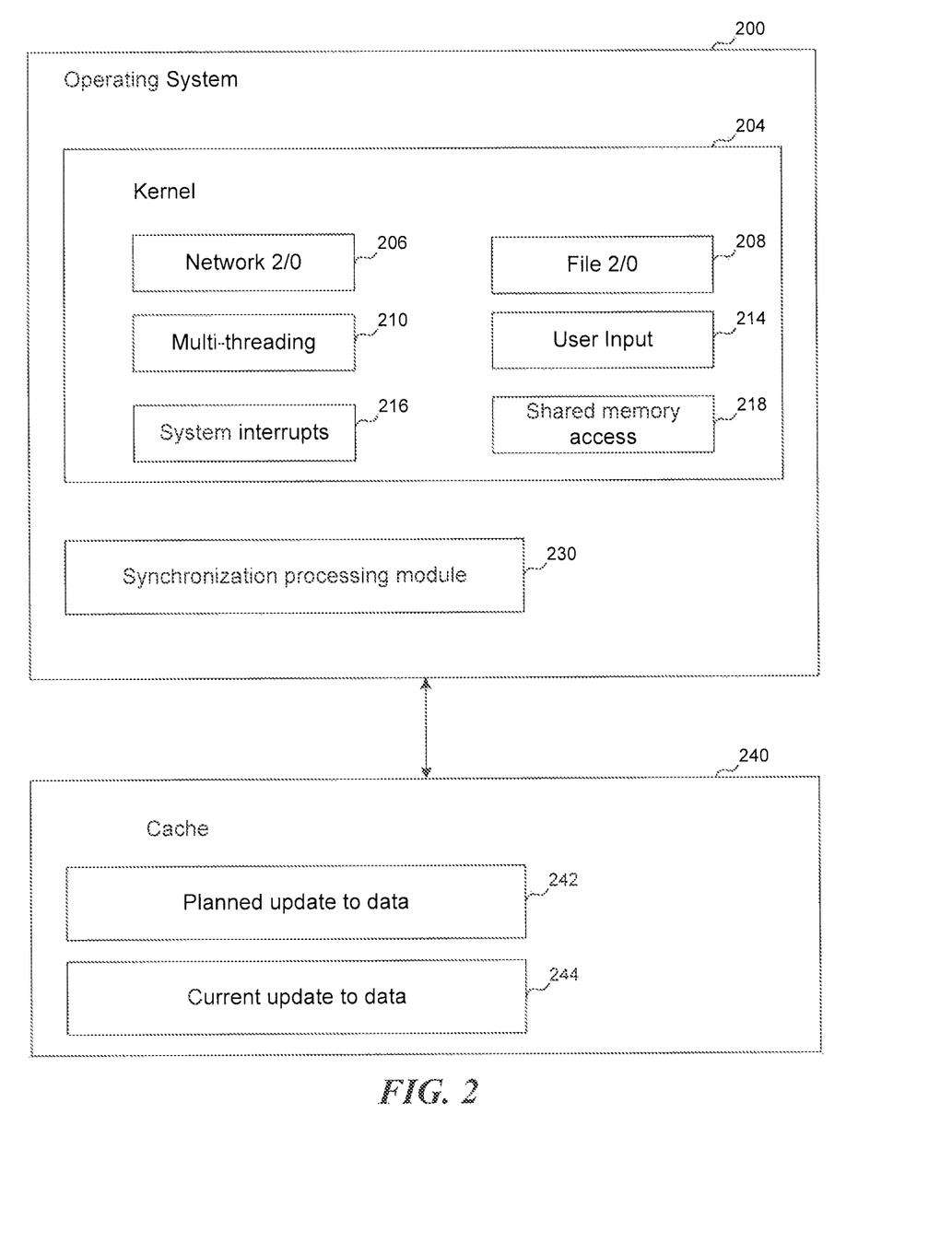
FIG. 2 illustrates an example operating system of a computing device.

FIG. 2 illustrates an example operating system of a computing device, according to one embodiment. The operating system 200 includes a kernel 204. The kernel 204 provides interfaces to hardware of the electronic device for the computer applications running on top of the kernel 204, and supervises and controls the computer applications. The kernel 204 isolates the computer applications from the hardware. The kernel 204 may include one or more intervening sources that can affect execution of a computer application. In one embodiment, the kernel 204 includes a network I/O module 206, a file I/O module 208, multi-threading module 210, user input 214, system interrupts 216, and shared memory access 218.

A synchronization processing module 230 runs on top of the kernel 204. The synchronization processing module 230 is responsible for handing the updates to the data stored in the device 200 and data synchronization with the cloud service and other computing devices. In the example of FIG. 2, a cache 240 stores a planned update to the data 242. For data synchronization purpose, the synchronization processing module 230 sends the planned update 242 to a cloud server (e.g. cloud storage service 110). The cloud storage service 100 either confirms to the computing device 200 that the planned update to the data 242 is the winning update, or sends to the computing device 200 a winning update to the data 244 that overrides the planned update to the data 242.

In order to determine the winning update from the multiple conflicting updates from the computing devices, the cloud storage service can maintain a ranking list for deciding priorities of devices when there is a synchronization conflict.

Figure 3:
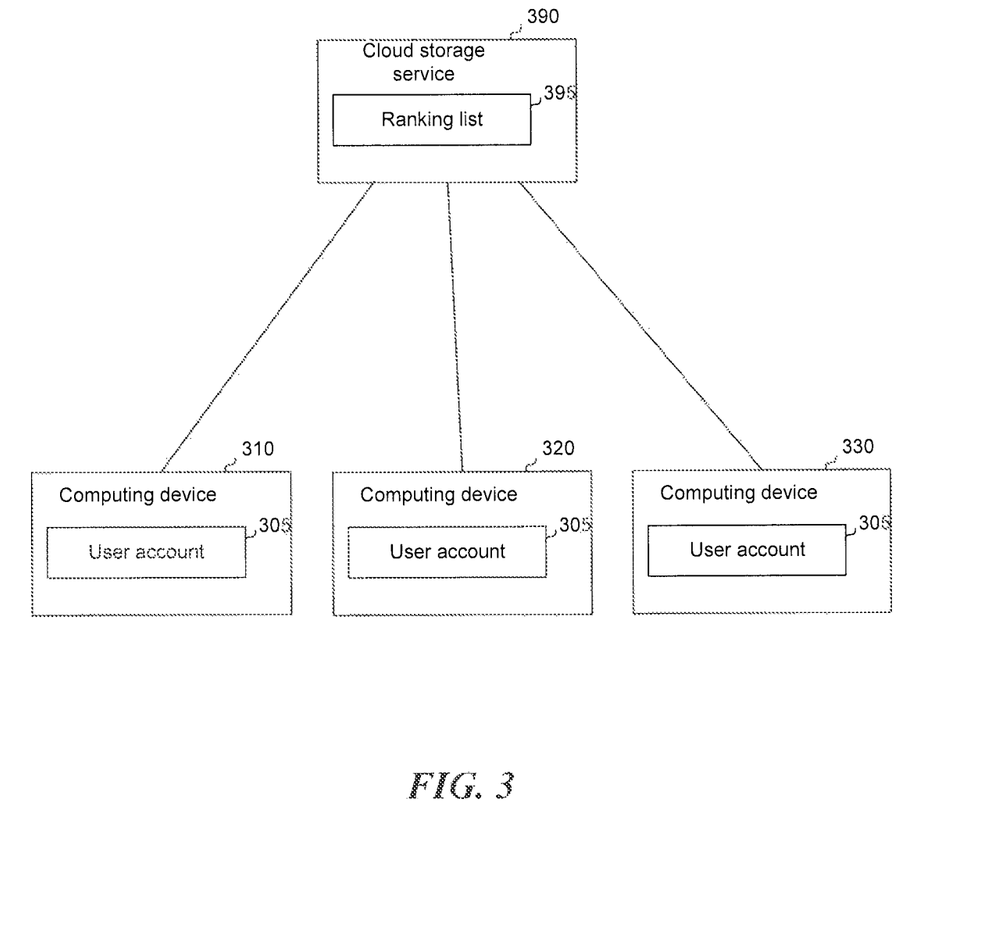
FIG. 3 illustrates an example environment for data synchronization between computing devices via a cloud storage service.

FIG. 3 illustrates an example environment for data synchronization between computing devices via a cloud storage service. For instance, a user acquires a new computing device 310 and logs into the computing device 310 using a user account 305 of the user. If the user does not have a user account for the cloud storage service 390, the computing device 310 can provide a user interface for the user to create a new user account 305 and uses the created account 305 to log into the computing device 310. When the user logs into the computing device 310, the computing device communicates with the cloud storage service 390 to check whether there are other computing devices associated with the user account 305. All computing devices associated with a single account are defined as a synchronization group. The computing devices in a synchronization group will synchronize the data among the computing devices in the synchronization group. If there are no other computing devices associated with the user account 305, the cloud storage service 390 will sends a confirmation to the computing device 310 to confirm that the user account 305 can log into the computing device 310.

When the user acquires another computing device 320, similarly the user can log into the computing device 320 using the same user account 305. During the log-in process, the computing device 320 communicates with the cloud storage service 390 to check whether there are other computing devices associated with the user account 305. The cloud storage service 390 determines that both devices 310 and 320 are associated with the user account 305. To track the device priorities, the cloud storage service 390 creates and maintains a ranking list 395 for identifying priorities of the devices 310 and 32 when there is a synchronization conflicts.

The cloud storage service 390 can prompt the user to determine the priorities. For instance, the cloud storage service 390 can send an instruction to the computing device 320. In response to the instruction, the computing device 320 can present a user interface (e.g. a questionnaire, selection interface, or input boxes) to prompt the user to determine the priorities of the computing devices 310 and 320. For instance, the computing device 320 can display a user interface on a display component of the computing device 320. The user can use one or more input components of the computing device 320 to determine the priorities of the devices.

Figure 4:
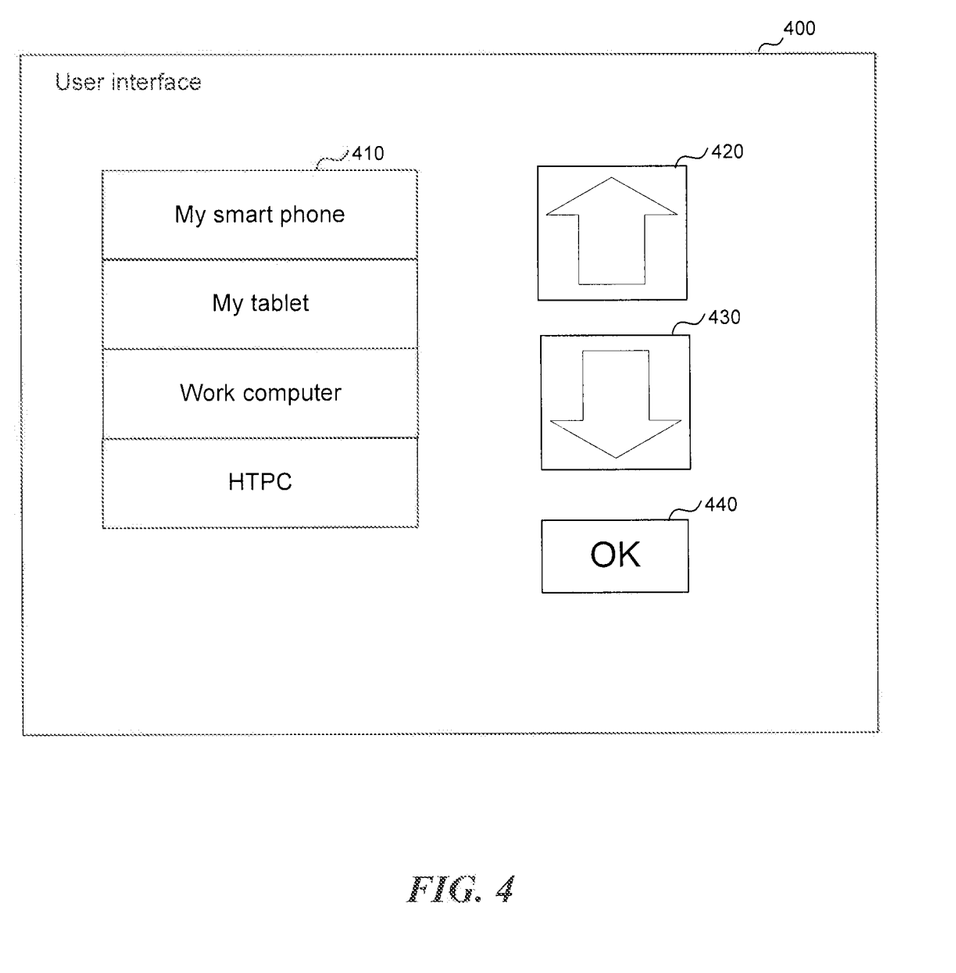
FIG. 4 illustrates an example of a user interface prompting a user to determine priorities of the devices.

FIG. 4 illustrates an example of a user interface prompting a user to determine priorities of the devices. The user interface 400 includes a list of the user devices 410 associated with a user account (e.g., user account 305). A device having a higher position in the list 410 will have a higher priority among the devices in the list 410. If any priorities of the devices in the list 410 have not yet decided yet, the user interface 400 can initially present the position of the undecided device in the list 410 in a random fashion, or present the position in a predetermined way (e.g., based on alphabetic order of the device name or time stamp when the device being associated with the user account).

The user interface 400 can further include an up arrow button 420 and a down arrow button 430. A user can select one of the devices in the list 410, and then clicks the up arrow button 420 or the down arrow button 430 to move the selected device upward or downward in the list 410. A user can select each device in the list 410 sequentially and adjust the position of each list using the button 420 and 430. Once the user has finished adjusting the positions of the devices in the list 410, which represents the priorities of the device in a synchronization group, the user can clicks ok button 440 to confirm his or her decision. If the computing device 320 presents the user interface 400 and receives a signal indicative that the user clicked the ok button, the computing device 320 sends the information about the user's decision on the device priorities to the cloud storage service 390.

In various embodiments, a computing device can prompt the user to decide priorities of one or more computing devices in situations other than user logging in. For instance, a computing device can prompt the user for priority determination during or after the computing device installs a user account for the user.

Figure 5A:
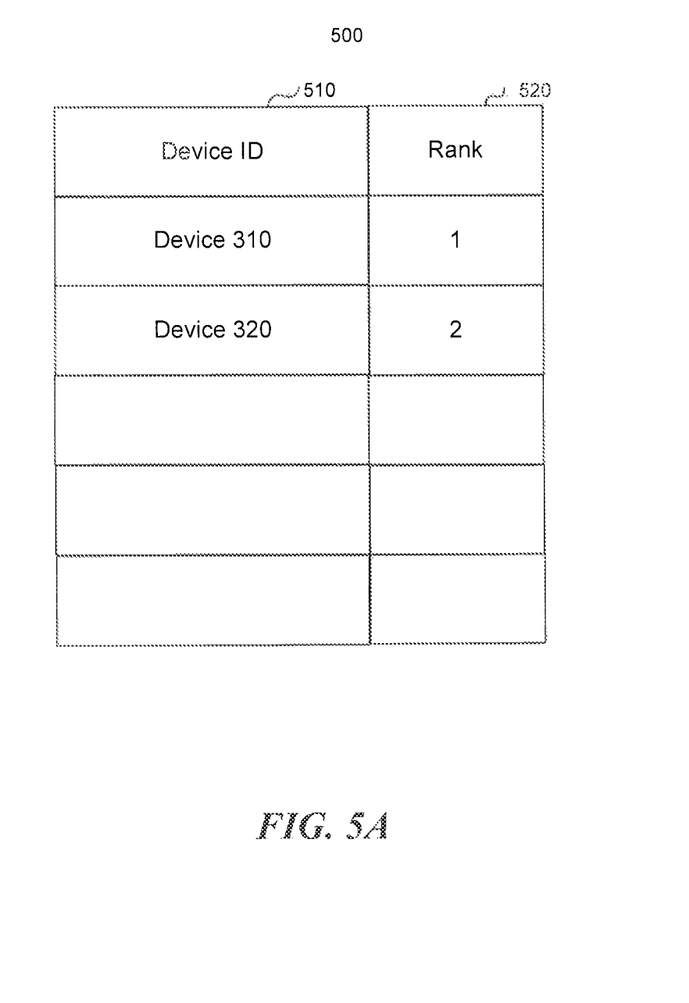
FIG. 5A illustrates an example of a ranking list.

The cloud storage service 390 determines the ranking list 395 based on the received user's decision. In various embodiments, the ranking list 395 can be a data structure, e.g., a database. FIG. 5A illustrates an example of a ranking list. A column 510 of the ranking list 500 stores identifications of the devices in a synchronization group. In various embodiments, the identifications of the devices can be device names, media access control address (MAC) addresses, Internet Protocol addresses (IP addresses), device serial numbers, or other types of identifications. A column 520 stores the ranks of the devices. The ranks can be represented by integers or other types of representations. In some embodiments, the smaller number represents a higher priority for the corresponding device. Some other embodiments can use other forms of representations, e.g. the larger number represents a higher priority for the corresponding device.

When the user acquires a third computing device 330, similarly the user can log into the computing device 330 using the same user account 305. During the log-in process, the computing device 330 communicates with the cloud storage service 390 to check whether there are other computing devices associated with the user account 305. The cloud storage service 390 determines that devices 310, 320 and 330 are associated with the user account 305.

The cloud storage service 390 can prompt the user again to determine the priorities since priority of the device 330 is not determined. For example, the cloud storage service 390 can send an instruction to the computing device 330 to present a user interface similar to the interface 400 to prompt the user to determine the priorities of the computing devices, including device 330. After the user inputs the decision of the priorities, the computing device 330 sends the information about the user's decision on the device priorities to the cloud storage service 390. Accordingly, the cloud storage service 390 updates the ranking list 395 such as the ranking list 520 in FIG. 5B.

Figure 5B:
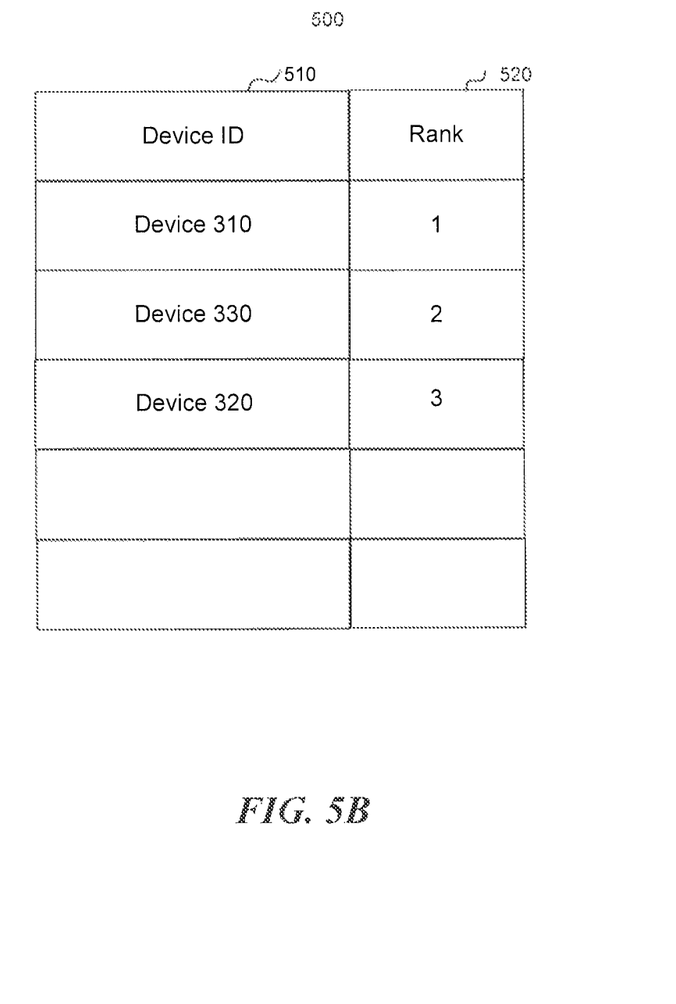
FIG. 5B illustrates another example of a ranking list.

In one example, the user decides through a user interface that device 330 has a priority between the devices 310 and 320. The cloud storage service 390 maintains the ranking list 520 as shown in FIG. 5B, wherein the devices 310, 320 and 330 are assigned with rank integers of 1, 3 and 2 respectively. When there is a synchronization conflict between devices 310 and 330, the cloud storage service determines that the update from device 310 will be the winning update since device 310 has a higher priority than device 330 in the ranking list 500. Similarly when there is a synchronization conflict between devices 330 and 320, the cloud storage service determines that the update from device 330 will be the winning update since device 330 has a higher priority than device 320 in the ranking list 500.

Figure 6:
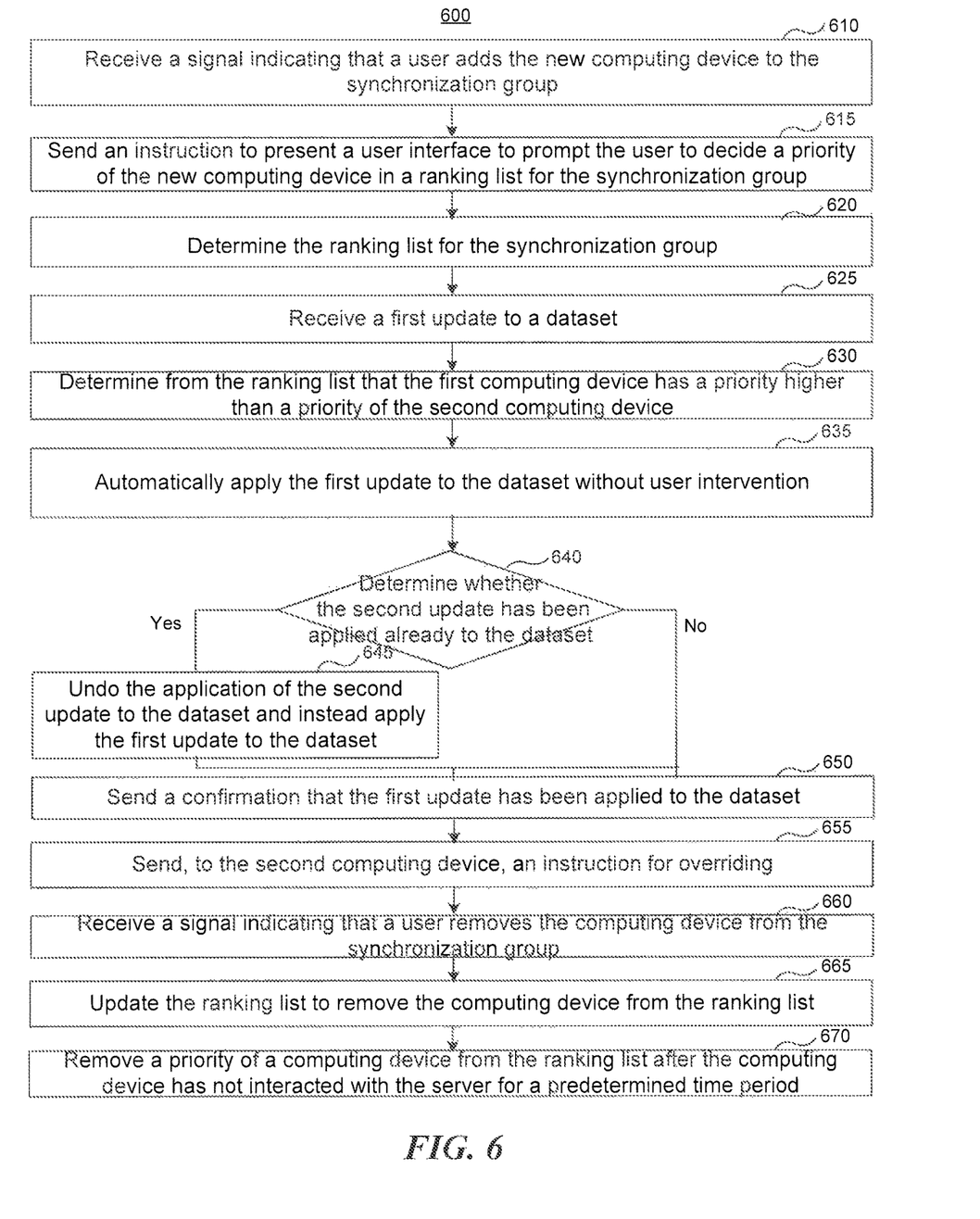
FIG. 6 illustrates an example of a process for maintaining a ranking list and resolving synchronization conflict.

The cloud storage service is responsible for maintain the ranking list and uses the ranking list to resolve synchronization conflict by determining a winning update to be applied to the data. FIG. 6 illustrates an example of a process 600 for maintaining a ranking list and resolving synchronization conflict. The process 600 starts at step 610, where a cloud storage service (also referred to as server) receives, from a new computing device, a signal indicating that a user adds the new computing device to the synchronization group including one or more computing devices for the user. The synchronization group identifies the computing devices for the user that have the same view for the data set. The data set can be a file or include a plurality of files. The data set can even include all or some of user data and application data on the computing devices in the synchronization group. The signal can be generated, e.g., in response to an event of the user logging on the new computing device or an event of a user account for the user being installed in the new computing device.

There can be multiple ranking lists for the devices of the synchronization group for different synchronization purpose. For instance, there can be a ranking list for synchronization of application data for a particular application. There can be a ranking list for synchronization between particular two or more devices in the synchronization group. There can be a ranking list for synchronization for one or more particular files stored in the devices of the synchronization group.

At step 615, the server sends, to the new computing device, an instruction to present a user interface to prompt the user to decide a priority of the new computing device in a ranking list for the synchronization group. The ranking list defines an order in which computing device of the plurality of computing devices wins in an event of data conflict.

The ranking list can be used to data conflicts for data with different granularities. For instance, the ranking list can be used to define priorities of the computing devices of the synchronization group for applying updates to one or multiple specific data sets. Alternatively, the ranking list can be used to define priorities of the computing devices of the synchronization group for applying updates to data of an application (or multiple applications) configured to run on one or more of the computing devices of the synchronization group. Or the ranking list can be used to define priorities of the computing devices of the synchronization group for applying updates to any data stored in the computing devices of the synchronization group.

A user can decide device priorities when a new computing device is added to the synchronization group or when a synchronization group is created. For instance, the server can send, to a computing device of the synchronization group, an instruction to present a user interface to prompt the user to decide the ranking list, in response to a signal indicating that the synchronization group is created.

At step 620, the server determines the ranking list for the synchronization group based on user inputs in response to the user interface. For instance, as FIG. 5B illustrates, the server can insert a device in the middle of the ranking list based on a user instruction.

At step 625, the server receives, from a first computing device of the synchronization group, a first update to a data set. Concurrently at step 630, the server receives, from a second computing device of the synchronization group, a second update to the data set. The first and second updates are different and conflict with each other. The term "concurrently" does not necessarily mean at the exact same time point. The server can receive concurrently the second update within a time period after receiving the first update. For instance, the server can concurrently receive, from the second computing device of the synchronization group, a second update to the data set before the first update being applied to the data set.

The first and second updates to the data set can includes various types of changes, e.g. a change of data in the data set, a change of metadata of the data set, a deletion of the data set, or a creation of the data set. The first update can include a different type of change from the second update. For instance, the first update can be a change of metadata (e.g., file name or access right attribute), while the second update can be a deletion of the file.

A step 630, the server determines from the ranking list that the first computing device has a priority higher than a priority of the second computing device. At step 635, the server automatically applies the first update to the data set without user intervention since the first computing device has a higher priority than the second computing device according to the ranking list. At step 640, the server can determine whether the second update has been applied already to the data set. If the second update has been applied already to the data set, at step 645, the server undoes the application of the second update to the data set and instead applies the first update to the data set. The second update to the data set is ignored since the second computing device has a lower priority. In some embodiments, the server ignores the second update as part of instruction to override the second update with the first update.

The server will distributed the winning update to the computing devices in the synchronization group. At step 650, the server sends, to the first computing device, a confirmation that the first update has been applied to the data set. At step 655, the server sends, to the second computing device, an instruction including the first update to the data set to prompt the second computing device to override the second update with the first update applied to a local copy of the data set stored in the second computing device.

The server maintains the ranking list and updates the ranking list when there is a change to the synchronization group. At step 660, the server receives, from a computing device of the synchronization group, a signal indicating that a user removes the computing device from the synchronization group. At step 665, the server updates the ranking list for the synchronization group to remove the computing device from the ranking list. The server can further remove any device from the ranking list if a device has not been used for a time period, even that the user has not explicitly remove the device from the synchronization group. For instance, at step 670, the server removes a priority of a computing device from the ranking list after the computing device has not interacted with the server for a predetermined time period.

Those skilled in the art will appreciate that the logic illustrated in FIG. 6 and described above, and in each of the flow diagrams discussed below if any, may be altered in a variety of ways. For example, the order of the logic may be rearranged, substeps may be performed in parallel, illustrated logic may be omitted, other logic may be included, etc.

Figure 7:
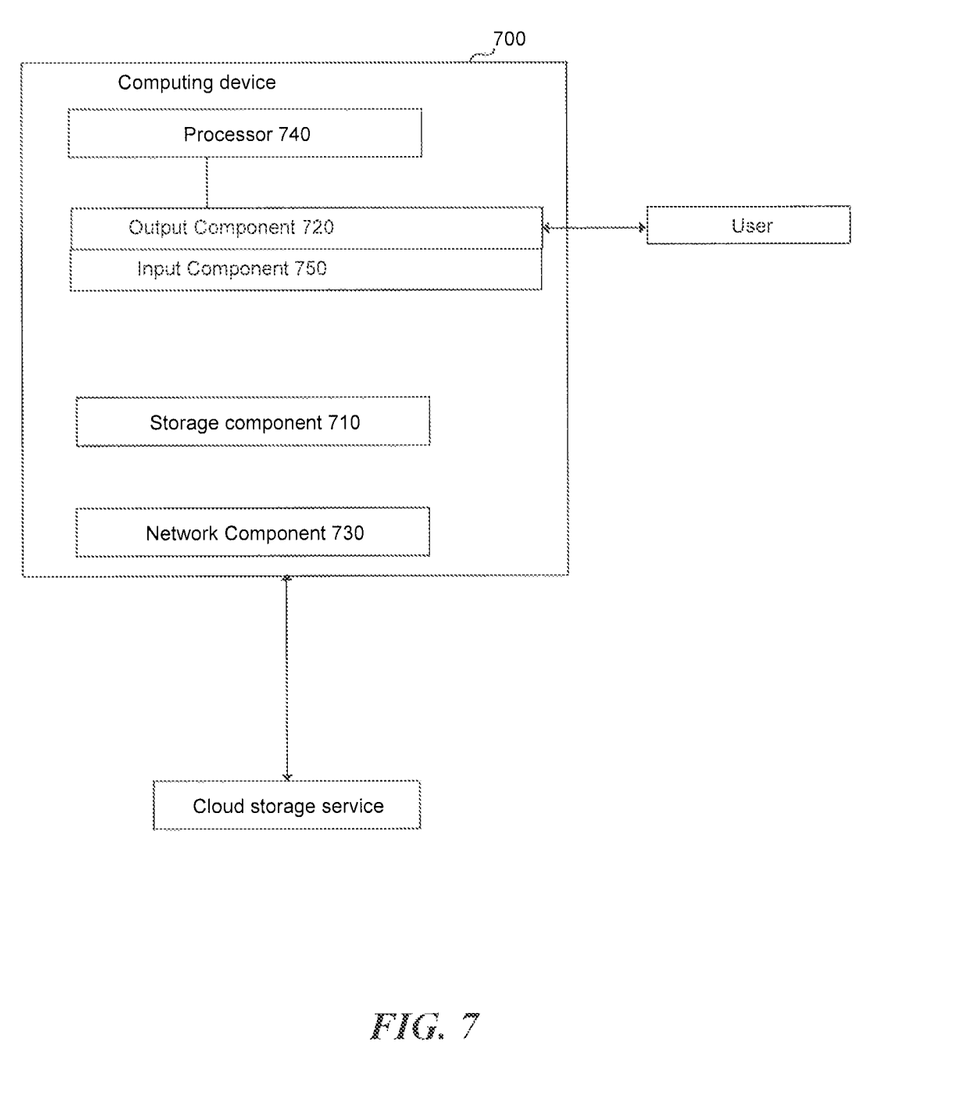
FIG. 7 illustrates an example of a computing device for data synchronization.

The computing devices in the synchronization group can be responsible for data synchronization and interacting with the user for instructions for the device priorities. FIG. 7 illustrates an example of a computing device 700 for data synchronization. The computing device 700 includes a storage component 710, an output component 720, a network component 730 and a processor 740. The storage component 710 is configured to store one or more data sets. The computing device 700 and a second computing device both store the data set. Via a cloud storage service, the computing device 700 and the second computing device can synchronized the updates to the data set.

The output component 720 is configured to present a user interface to prompt a user to decide a priority of the computing device in a ranking list for a synchronization group. The computing device 700 can further include an input component 750 configured to receive a user input in response to the prompt of the user interface for deciding the device priority. In various embodiments, the input component 750 and the output component 720 can be a single component, such as a touch screen.

The network component 730 is configured to send to a user input in response to the user interface for the ranking list to a server (e.g. a cloud storage service). The network component 730 is further configured to send a first update of the data set to the server. Concurrently, the second computing device sends a second update of the data set to the server.

The server determines which of the first and second updates the winning update is by examining the priorities in the ranking list, as FIG. 6 illustrates. The computing device 700 will receive the second update via the network component 730 if the server determines the second computing device has a higher priority. The processor 740 is configured to apply the second update to the data set stored in the storage component. In other words, the processor 740 is configured to override the first update with the second update and automatically apply the second update to the data set stored in the storage component without user intervention.

Figure 8:
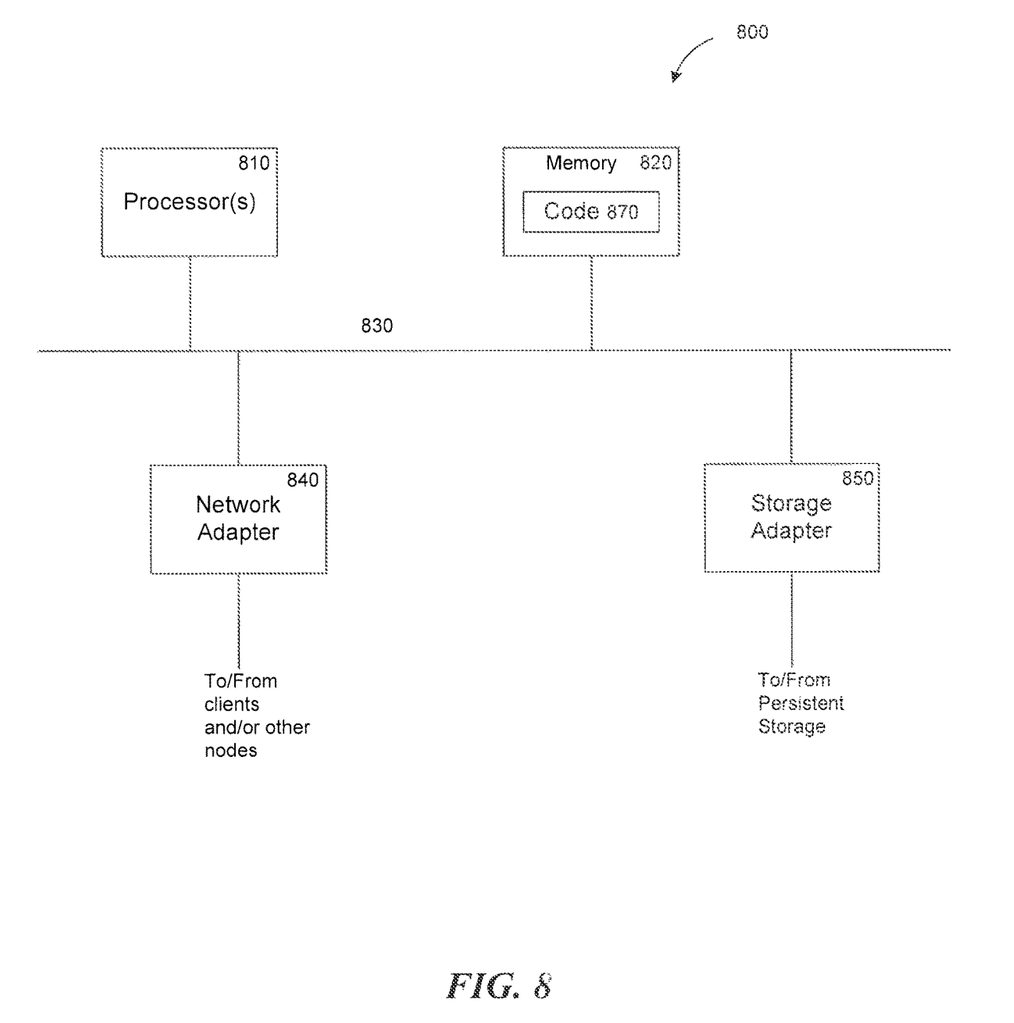
FIG. 8 is a high-level block diagram showing an example of the architecture of a computer, which may represent any computing device or server described herein.

FIG. 8 is a high-level block diagram showing an example of the architecture of a computer 800, which may represent any computing device or server described herein. The computer 800 includes one or more processors 810 and memory 820 coupled to an interconnect 830. The interconnect 830 shown in FIG. 8 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the computer 800 and, thus, control the overall operation of the computer 800. In certain embodiments, the processor(s) 810 accomplish this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computer 800. The memory 820 represents any form of random access memory (RAM), read-only memory (ROM), flash memory, or the like, or a combination of such devices. In use, the memory 820 may contain a code 870 containing instructions according to the technology disclosed herein.

Also connected to the processor(s) 810 through the interconnect 830 are a network adapter 840 and a storage adapter 850. The network adapter 840 provides the computer 800 with the ability to communicate with remote devices, over a network and may be, for example, an Ethernet adapter or Fibre Channel adapter. The network adapter 840 may also provide the computer 800 with the ability to communicate with other computers. The storage adapter 850 allows the computer 800 to access a persistent storage, and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the computer 800 by downloading it from a remote system through the computer 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A computer-implemented method comprising:
 receiving, at a server from a new computing device, a signal indicating that a user adds the new computing device to a synchronization group including computing devices for the user;
 sending, from the server to the new computing device, an instruction to present a user interface to prompt the user to decide a priority of the new computing device in a first ranking list for the synchronization group, wherein the first ranking list defines an order determining which computing device of the synchronization group of the computing devices wins in an event of data conflict;
 determining, at the server, the first ranking list for the synchronization group based on user inputs in response to the user interface, wherein the synchronization group of the computing devices has a plurality of ranking lists including the first ranking list, a second ranking list, and a third ranking list, wherein the second ranking list is defined for synchronization of application data for a particular application, wherein the third ranking list is defined for synchronization for one or more particular files stored in the computing devices of the synchronization group;

receiving, at the server from a first computing device of the synchronization group, a first update to a data set;

concurrently receiving, at the server from a second computing device of the synchronization group, a second update to the data set;

determining from the first ranking list that the first computing device has a priority higher than a priority of the second computing device;

automatically applying the first update to the data set without user intervention; and removing a priority of any given computing device of the synchronization group from the first ranking list after the given computing device has not interacted with the server for a predetermined time period, wherein removing the priority of the given computing device comprises at least one of removing the given computing device from the first ranking list or removing a rank of the given computing device from the first ranking list.

2. The computer-implemented method of claim 1, wherein the step of sending an instruction comprises:

sending, from the server to a computing device of the synchronization group, an instruction to present a user interface to prompt the user to decide the first ranking list, in response to a signal indicating that the synchronization group is created.

3. The computer-implemented method of claim 1, further comprising:

sending, from the server to the first computing device, a confirmation that the first update has been applied to the data set.

4. The computer-implemented method of claim 1, further comprising:

sending, from the server to the second computing device, an instruction including the first update to the data set to prompt the second computing device to override the second update with the first update applied to a local copy of the data set stored in the second computing device.

5. The computer-implemented method of claim 1, wherein the synchronization group identifies computing devices for the user that have the same view for the data set.

6. The computer-implemented method of claim 1, further comprising:

receiving, at a server from a computing device of the synchronization group, a signal indicating that a user removes the computing device from the synchronization group; and updating, at a server, the first ranking list for the synchronization group to remove the computing device from the first ranking list.

7. The computer-implemented method of claim 1 wherein the signal indicating that the user adds the new computing device to the synchronization group is generated in response to an event of the user logging on the new computing device.

8. The computer-implemented method of claim 1, further comprising:

ignoring the second update to the data set.

9. The computer-implemented method of claim 1, wherein the data set includes a file or a data structure of metadata.

10. The computer-implemented method of claim 1, wherein the first ranking list defines priorities of the computing devices of the synchronization group for applying updates to the data set.

11. The computer-implemented method of claim 1, wherein the first ranking list defines priorities of the computing devices of the synchronization group for applying updates to data of an application configured to run on one or more of the computing devices of the synchronization group.

12. The computer-implemented method of claim 1, wherein the first ranking list defines priorities of the computing devices of the synchronization group for applying updates to data stored in the computing devices of the synchronization group.

13. The computer-implemented method of claim 1, wherein the first and second updates to the data set includes a change of data in the data set, a change of metadata of the data set, a deletion of the data set, or a creation of the data set.

14. The computer-implemented method of claim 1, wherein the concurrently receiving comprises:

receiving, at the server from a second computing device of the synchronization group, a second update to the data set before the first update is applied to the data set.

15. The computer-implemented method of claim 1, wherein the automatically applying comprises:

if the second update has been applied already to the data set, undoing the application of the second update to the data set and applying the first update to the data set.

16. The computer-implemented method of claim 1, wherein the second ranking list comprises two or more ranking lists, wherein each ranking list of the two or more ranking lists corresponds to a respective synchronization of application data for an application.

17. A computing device comprising:

a memory configured to store a data set;

a display configured to present a user interface to prompt a user to decide a priority of the computing device in a first ranking list for a synchronization group, wherein the synchronization group includes computing devices for the user, wherein the first ranking list defines an order determining which computing device of the synchronization group of the computing devices wins in an event of data conflict, wherein the synchronization group of the computing devices has a plurality of ranking lists including the first ranking list, a second ranking list, and a third ranking list, wherein the second ranking list is defined for synchronization of application data for a particular application, wherein the third ranking list is defined for synchronization for one or more particular files stored in the computing devices of the synchronization group;

a network adapter configured to send a message indicating the user's decision to the server;

the network adapter further configured to send a first update of the data set to the server;

the network adapter further configured to receive from the server a second update of the data set, wherein the second update has been generated by a second computing device having a priority higher than the priority of the computing device based on the first ranking list;

a programmable general-purpose processor configured to apply the second update to the data set stored in the storage component; and the programmable general-purpose processor configured to remove a priority of any given computing device of the synchronization group from the first ranking list after the given computing device has not interacted with the server for a predetermined time period, by at least one of removing the given computing device from the first ranking list or removing a rank of the given computing device from the first ranking list.

18. The computing device of claim 17, wherein the display is configured to present the user interface when the user logs into the computing device for the first time, or when the computing device installs a user account for the user.

19. The computing device of claim 17, wherein the data set are stored in the computing device and the second computing device, and the first update and the second updates of the data set are sent to the server concurrently.

20. The computing device of claim 17, wherein the second update is determined by the server as a winning update to the data set based on the priorities of the computing device and the second computing device in the first ranking list.

21. The computing device of claim 17, wherein the processor is configured to override the first update with the second update and automatically apply the second update to the data set stored in the storage component without user intervention.

22. A system for resolving synchronization conflicts, the system comprising:
   a network adapter configured to communicate with computing devices belonging to a synchronization group;
   a programmable general-purpose processor; and
   a memory storing instructions which, when executed by the processor, cause the system to perform a process including:
      determining a first ranking list for the synchronization group based on a user input indicating a priority of a new computing device in the first ranking list, wherein the first ranking list defines an order determining which computing device of the synchronization group of the computing devices wins in an event of data conflict, wherein the synchronization group of the computing devices has a plurality of ranking lists including the first ranking list, a second ranking list, and a third ranking list, wherein the second ranking list is defined for synchronization of application data for a particular application, wherein the third ranking list is defined for synchronization for one or more particular files stored in the computing devices of the synchronization group;
      receiving two conflicting updates to a data set from a first computing device and a second computing device respectively, wherein the first computing device and the second computing device belong to the synchronization group;
      determining a winning update from the two conflicting updates based on the priorities of the first and second computing devices in the first ranking list;
      applying the winning update by sending the winning update to at least one of the computing devices of the synchronization group; and
      removing a priority of any given computing device of the synchronization group from the first ranking list after the given computing device has not interacted with the server for a predetermined time period, wherein removing the priority of the given computing device comprises at least one of removing the given computing device from the first ranking list or removing a rank of the given computing device from the first ranking list.

23. The system of claim 22, wherein the user input is collected from the new computing device when the new computing device joins the synchronization group.

24. The system of claim 22, wherein the new computing device joins the synchronization group when the user logs into the computing device for the first time, or when the computing device installs a user account for the user.

* * * * *